United States Patent Office 3,345,567
Patented Oct. 3, 1967

3,345,567
MULTIPOINT PROBE APPARATUS FOR ELECTRICALLY TESTING MULTIPLE SURFACE POINTS WITHIN SMALL ZONES
Roger S. Turner, Philadelphia, and Clyde O. Drauglis, Willow Grove, Pa., assignors to Kulicke and Soffa Manufacturing Company, Fort Washington, Pa., a corporation of Pennsylvania
Filed Feb. 26, 1964, Ser. No. 347,406
24 Claims. (Cl. 324—158)

This invention relates to a probe testing apparatus, and more particularly relates to a multi-point probe instrument for testing the electrical characteristics of semiconductor microcircuits and wafers or substrates with deposited geometries thereon.

In the manufacture of semiconductor devices, regular and repeating patterns of minute, discrete junctions or electrodes, termed in the art "geometry" are deposited usually through a mask upon the surface of thin slices or slabs of semiconductor crystals, wafers or substrates. The surface junctions or electrodes may be in the shape of stripes, dots, circles, or the like, and may be compositions of gold, silver, antimony, aluminum, and/or other elements, compounds, or alloys. These materials form junctions which produce diverse conductivity in crystals such as germanium or silicon depending upon the desired characteristics of the finished semiconductive device. Within an area less than an ⅛-inch square, there can be as many as ten or fifteen of such discrete junction electrodes, each having dimensions not exceeding a few mils in breadth and possibly spaced from each other by the same order of magnitude. The "geometry" within the area defined will ultimately have lead wire connections bonded thereto for forming the circuitry of a semiconductive device (transistor, diode, microcircuit) after chips or dices have been cut from the thin slab. The slab itself may contain perhaps many hundreds of individual geometric sets arranged in accurately disposed rows and files.

As is well recognized, the junction electrodes may have been imperfectly deposited or alloyed upon the surface of the dice or certain of the dice themselves may have crystallographic irregularities, such as dislocations or strains, which would lead to defective operation of the completed semiconductor device. It is thus desirable and economical to test the electrical characteristics of the individual zones or geometric patterns even before they have been cut from the slice so that the defective zones can be marked and later discarded, thereby eliminating mounting or lead bonding of those chips which would fall outside the range of acceptable tolerances.

It is with the inspection testing of the electrical characteristics of the individual geometry on the wafer and substrate slices prior to dicing that this invention is concerned. In prior U.S. Patent No. 3,185,927 by Lawrence G. Margulis et al., granted May 25, 1965, there is described a two-point probe instrument for testing the characteristics of or between pairs of surface electrodes arranged in a repeating pattern on a wafer slice. The present invention, while akin to the device of the foregoing patent, is an improvement thereover particularly in view of the large number (ten individual probe points shown and described) of discrete junction electrodes capable of being tested simultaneously.

In the inspection testing of a large number of points on the wafer slice, not only does the problem of accurate orientation increase but also there is a greater degree of difficulty in the application of uniform contact pressure on each of the surface points to be tested. Great delicacy and balance of the probe heads must be provided so that correct readings are obtained without unintentionally marring or injuring the crystal surface or the electrodes themselves. Furthermore, it is desirable to perform the testing operations rapidly in order to avoid unduly increasing the cost of already expensive fabrication procedures. In addition, the multiprobe instrument must be quite flexible so as to accommodate readily wide variations in the design of the semiconductor surface geometry. Moreover, the multi-point probe device must be adapted to scan the entire wafer area and to index upon and sequentially register with the geometry of the respective dice zones.

It is therefore an object of this invention to provide a multi-point probe instrument for rapidly scanning and testing the electrical characteristics of semiconductor wafers and substrates having integrated and multicircuit geometrics deposited on the surface thereof in regularly, repeating files and rows.

Another object of this invention is to provide a multi-point probe instrument which is adapted to accommodate wide variations in the design of geometry.

Another object of this invention is to provide a multi-point probe instrument which can rapidly mark the defective zones with a codifying ink designation for indicating the nature of the defect.

Still another object of this invention is to provide a multi-point probe instrument in which the probe heads can be delicately balanced so that uniform pressure can be applied to all surface points to be tested.

Yet another object of this invention is to provide a multi-point probe instrument for accurately testing the electrical characteristics of semiconductor wafers without contaminating or damaging the zones under examination.

A still further object of this invention is to provide a multi-point probe instrument in which the geometry of each zone of the semiconductor wafer can be rapidly and successively indexed automatically so as to minimize manipulative positioning.

Still an additional object of this invention is to provide a multi-point probe instrument yielding a maximum number of structurally rigid probing points within a given area.

Yet a further object of this invention is to provide a multi-point probe instrument which is adapted for either operator controlled or computer testing.

Other objects of this invention are to provide an improved device of the character described which is easily and economically produced, sturdy in construction, and highly efficient and effective in operation.

With the above and related objects in view, this invention consists of the details of construction and combination of parts as will be more fully understood from the following detailed description when read in conjunction with the following drawings in which.

Referring now in greater detail to the drawings in which similar reference characters refer to similar parts, the multipoint test probe instrument of the instant invention basically comprises a frame, generally designated as A, a vacuum chuck B for holding a semiconductor wafer W, an indexing slider assembly C supporting the chuck so that successive zones on the wafer can be sequentially oriented into position for inspection, and a plurality of probe heads D magnetically secured upon a horizontally slidable platen E disposed above the wafer chuck. Points on the probe heads D are each adapted to be individually positioned for registration with the configuration of the wafer geometry and thereafter to be simultaneously urged into contact with the respective surface indicia. A micromanipulator F is provided for horizontally orienting the platen E whereby the points of the probe heads D can be simultaneously brought into registration with the entire geometry of each dice zone as it is coarsely indexed into position by the slider assembly C. Non-destructive ink markers D1 (similar in construction to the probe heads D) are also provided for applying a blob of a color upon defective portions of the wafer.

The frame A includes a table 12 having a column 14 supporting a control module 16. The micromanipulator F is also mounted upon the column 14 and comprises a "chessman" micropositioning device substantially identical to that fully shown and described in U.S. Patent No. 3,149,510, for an invention by Frederick W. Kulicke, Jr. entitled "Fine Wire Manipulator and Bonding Instrument for Transistors."

Figure 1:
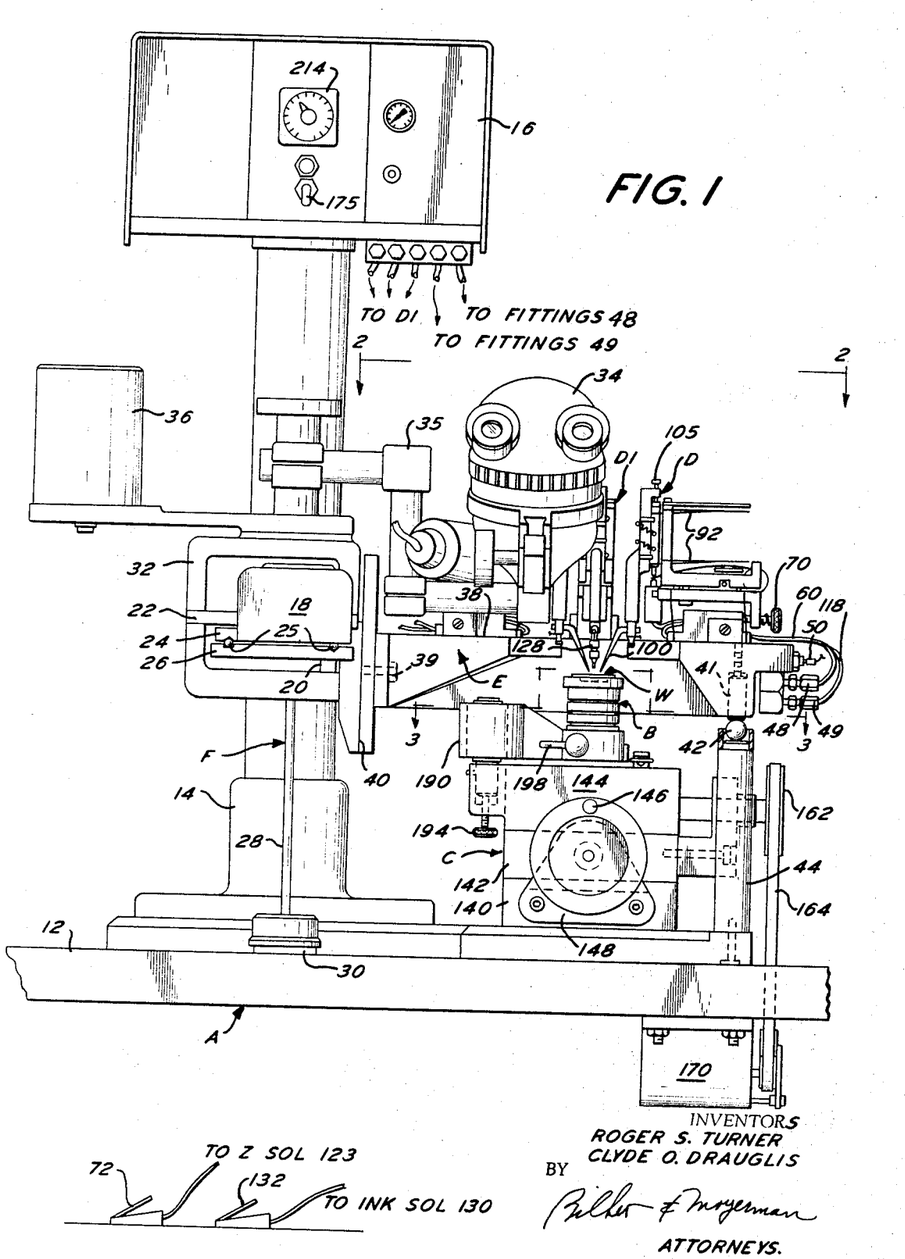
FIGURE 1 is a front elevational view of a multi-point test probing device embodying this invention.

Referring to FIGURE 1, the manipulator F includes a housing member 18 which is mounted upon the column 14 by a bracket 20. X- and Y-stages 22 and 24 are slidably oriented upon balls 25 with respect to a fixed state 26 secured to the lower edge of the housing 18. The X-stage 22 is coupled by a universal joint (not shown) to a downwardly depending rod 28 which is also universally coupled within the fixed state 26. A "chessman" finger piece 30 is universally coupled to the lower end of the rod 28 and is slidable on the upper surface of the table 12. Horizontal positioning or slidable movement of the finger piece 30 on the table 12 transmits a proportionally reduced movement (40 to 1) in the opposite direction along the corresponding X- and Y-axes to a yoke 32 which is affixed to the X-slider 22. Movement of the yoke 32 accordingly shifts the position of the platen assembly E together with a stereo microscope 34 through which the orientation of the probe tips with respect to the wafer indicia are observed under 3-dimensional magnification. The microscope 34 is hingedly mounted by an adjustable bracket pod 35 upon the upper portion of the yoke 32 so as to permit observation of the precise area of the wafer W being examined. A counter weight 36 is also secured to the yoke 32 in order to counterbalance the cantilevered load of the microscope 34. It is to be observed that coupling the microscope 34 with the manipulator movement provides an advantage over a stationary mounting in that travel of the microscope with the points themselves enables the probe tips to be maintained in focus at all times.

The platen assembly E includes a flat ground cast iron probe support plate 38 which is secured by bolts 39 to vertical mounting member 40 downwardly depending from yoke 32. The outboard end of the plate 38 contains hardened dowel pads 41 which rest upon and roll over balls 42 carried within support posts 44. Thus, by movement of the finger piece or shoe 30 on the table top 12 the entire platen assembly E is correspondingly shifted in a horizontal plane upon the balls 42 whereby the probe tips can be precisely brought into registration with points on the water surface which are to be tested. The central portion of the plate 38 has a circular recess 46 through which the probe tips downwardly project. A divergent or pie-shaped opening 47 at the forward portion of the plate 38 communicates with the circular recess 46 and permits the chuck B to be swung into position for inspection of the wafer W retained thereon. Disposed about the periphery of the plate 38 are a plurality of fittings 48 and 49 which connect respectively with an X-manifold and a Z-manifold communicating with a source of air under pressure through valves 74 and 123. Similarly, a plurality of binding posts 50 are mounted about the edges of the platen E, each of which is connected through a corresponding electrical line (not shown) to measuring instruments for determining the characteristics of points on the wafer being probe tested.

Figure 2:
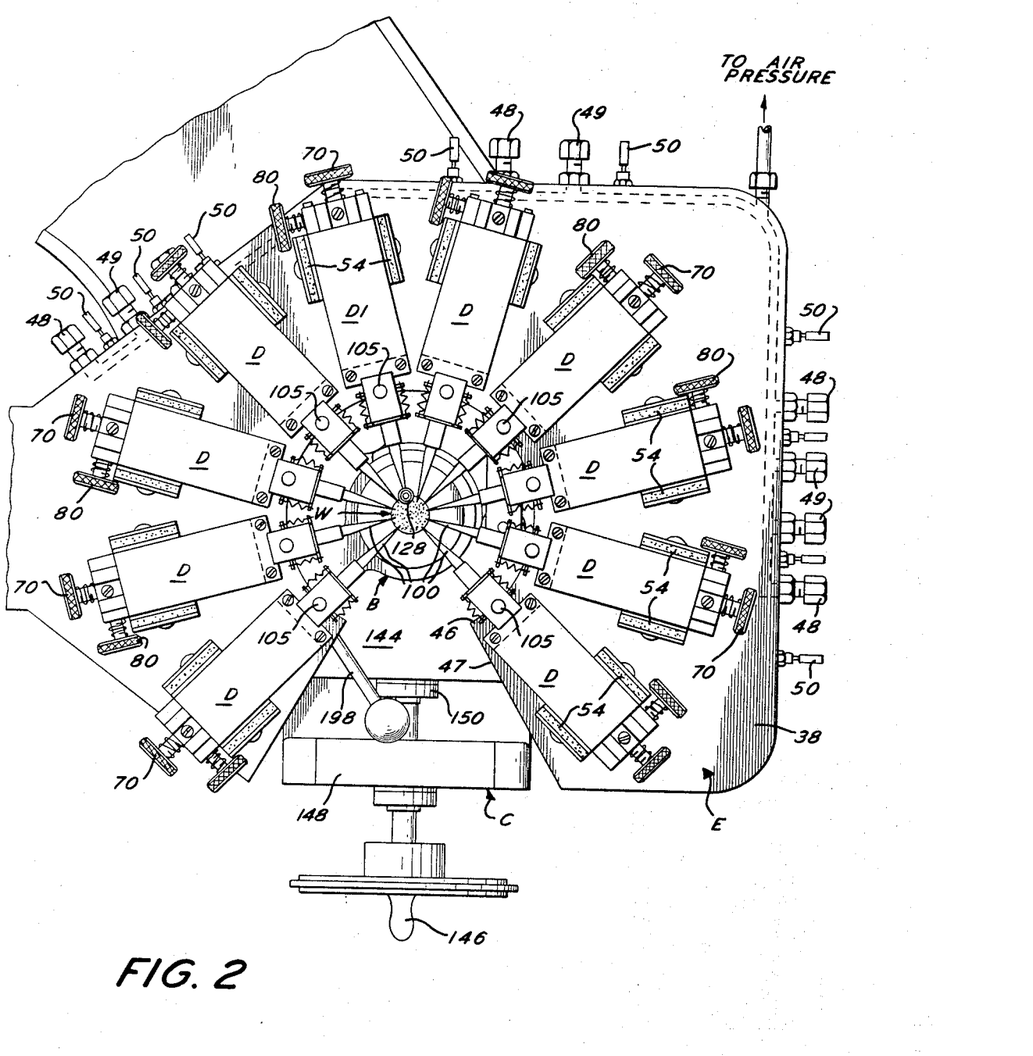
FIGURE 2 is a sectional view taken along lines 2—2 of FIGURE 1.
Figures 6, 8:
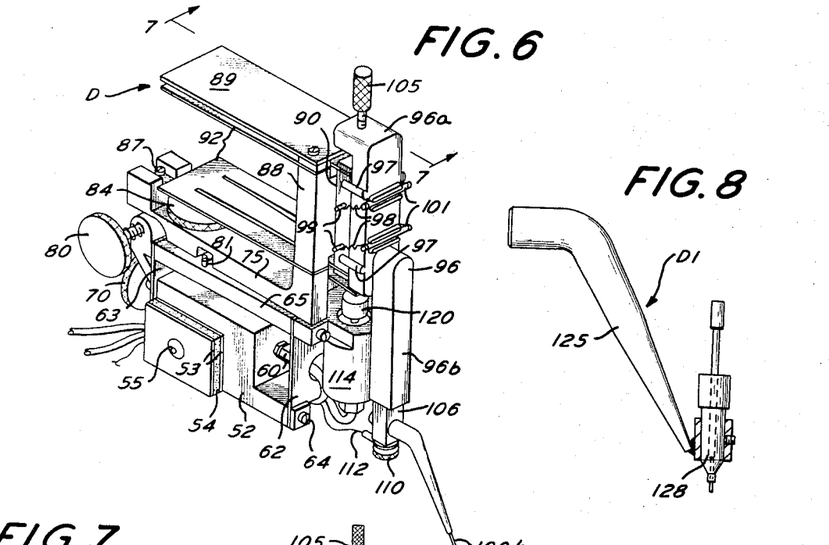
FIGURE 6 is a perspective view of a probe head unit embodied in this invention.
FIGURE 8 is a side elevational view and partly in section of a single probe point equipped with an obliterating ink fountain.
Figures 7, 9:
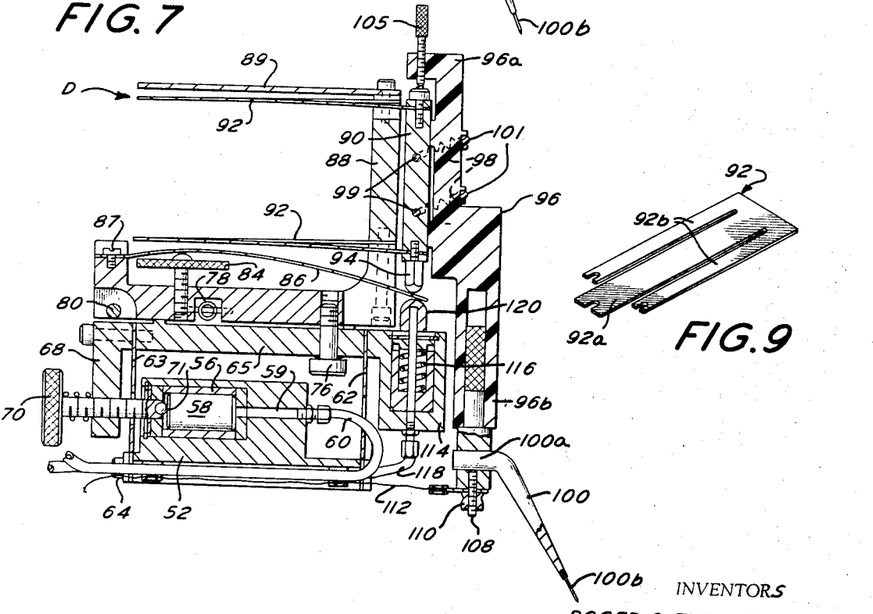
FIGURE 7 is a sectional view taken along lines 7—7 of FIGURE 6.
FIGURE 9 is a perspective view of a leaf spring support embodied in the probe head.

The probe heads D and the inking heads D1 are slidably positioned circularly in a generally pie-shaped configuration upon the upper surface of the platen E, as shown in FIGURE 2, so that the probe tips extend downwardly immediately above the wafer W held in the chuck B. The construction of the probe heads themselves is best illustrated in FIGURES 6 and 7. Each probe head D includes a base 52 having a pair of magnets 54 at the lateral edges thereof which are attracted by the cast iron plate 38. The magnets 54 are formed of finely powdered magnetic materials, such as alloyed barium ferrite powders uniformly dispersed in a molded rubber composition, for example, "Plastiform" made by the Magnetic Division of the Leyman Corporation, Cincinnati, Ohio. A pair of pole pieces 53 sandwiches each magnet and these are secured to the base 52 by screws 55. Arrangement of the probe points around a pie section permits maximum utilization of space.

An internal cylinder 56 within the base 52 contains a reciprocable piston 58. The cylinder 56 communicates through a bore 59 with tubing 60 which is coupled to one of the fittings 48 on the pressurized air manifold. Cantilever springs 62 and 63 are secured to the forward and rear edges of the base 52 by mounting screws 64. Resiliently supported between the upper edges of the cantilever springs 62 and 63 is a floating X-axis carriage 65. The rear edge of the X-carriage 65 has a downwardly extending mounting bracket 68 in which is threaded a knurled adjustment screw 70. The end of the screw 70 has a ball bearing tip 71 which abuts against the back face of the piston 58, and permits fine adjustment of the probe tip along the horizontal longitudinal axis of the probe head D. In normal operation, the cylinder 56 is disconnected from the air pressure line because X-retract solenoid 74 is de-energized so as to urge the piston 58 to the right, as shown in FIGURE 7. The X-carriage 65 is resiliently urged from left-to-right as a result of bias of the cantilever springs 62 and 63 acting against the X-axis adjustment screw 70. Depression of pen foot switch 132 not only actuates inking solenoid 130 but also X-retract solenoid 74 as well to supply air pressure to the X-manifold fittings 48 so as to throw piston 58 and the X-carriage 65 to the left approximately ⅛″ when a zone is to be marked defective. That is, as will be more fully set forth hereinafter, horizontal retraction of the probe tips are effected during marking in order to avoid interference with the inking pens.

A Y-axis carriage 75 is pivotally supported above the X-carriage 65 by a shoulder screw 76. The shoulder bolt 76 extends through reamed hole in the X-carriage 65 and is threaded within a tapped hole in the Y-carriage. Coil spring 78 tensioned between pin 81 upwardly extending from the X-carriage 65 and hanger 82 biases the Y-carriage against knurled adjusting thumb screw 80 also threaded in the mounting bracket 68. Clockwise rotation of the Y-adjustment screw 80 produces fine clockwise rotation of the Y-carriage 75 in a horizontal plane about the shoulder screw 76. A force adjusting screw 84 is vertically threaded into a tapped hole in the Y-carriage 75 and bears against a medial portion of flat counter spring 86 having one end secured by screw 87 to the rear edge of the Y-carriage 75. The free outboard edge of the counter spring 86 is urged upwardly against a floating Z-carriage 90 and controls the force at which the latter may descend.

The Z-carriage 90 is resiliently suspended as a parallelogram upon a pair of vertically spaced flat spring elements 92 which are secured upon an H-shaped support member 88 upwardly extending from the forward portion of the Y-carriage 75. Each of the spring elements 92 are fabricated of .010″ beryllium-copper flat spring material which is E-shaped in a plan configuration having a central tongue 92a (coupled to the Z-carriage 90) disposed intermediate a pair of lateral arms 92b (connected to the support member 88). A flat guard 89 is mounted to the top of the support member 88 and extends above the upper spring element 92 to help protect the latter from damage if accidentally bumped. The lower end of the Z-carriage 90 has a lift pin 94 which bears against the counter spring 86.

The front surface of the Z-carriage 90 has a probe mount 96 resiliently urged into face-to-face slidable abutment therewith. The probe mount 96 is molded from a high resistance plastic material, such as nylon, to insulate the probe tip 100 from the probe body and the frame. The mount 96 includes an upper member 96a havnig a pair of guide shoulders 97 on each side thereof which embrace the lateral edges of the Z-carriage 90 and an offset lower body portion 96b. Springs 98 are hung upon pins 99 outwardly extending from the sides of the Z-carriage and hangers 101 mounted within grooves in the front face of the mount upper member 96a. These springs 98 not only urge the probe mount 96 into face-to-face contact with the Z-carriage 90 but also bias the probe mount downwardly with respect thereto. A knurled vertical adjustment screw 105 is vertically threaded through an overhanging portion of the upper member 96a and bears against a stop pin 102 at the top of the Z-carriage 90. The screw 105 permits fine vertical adjustment of the probe tip 100 above the wafer W.

The probe tip 100 is generally of obtuse inverted L-shaped configuration and is made of a highly conductive material such as brass. It has a mounting leg 100a which is circular in cross-section and a conically tapered portion which obliquely extends therefrom. A needle point 100b of a hard highly conductive alloy, e.g. osmium, is inserted within and downwardly projects from the end of the conically tapered portion. The leg 100a is rotatably supported within a reamed hold in clamp 106. The probe clamp 106 itself has an upper knurled neck portion which is press fit within a vertical bore in the body portion of the insulator mount 96. Set screw 108 is threaded through the lower portion of the clamp 106 into abutment with the probe tip 100 to prevent the latter from rotating. The set screw 108 also acts as a binding post for knurled nut 110 which retains a wire tested lead 112 in firm electrical contact with the probe tip. The lead 112 is connected at its opposite end to one of the binding posts 50 on the terminal strip of the platen E.

The Z-actuator comprises a cylindrical block 114 which is secured to the front edge of the X-carriage 75. A spring loaded air piston 116 communicates with tubing 118 connected to one of the mainfold fittings 49 to throw pin 120 normally upward against the counter spring 86 and lift pin 94 of the Z-carriage 90. Since the Z-actuator 116 normally is connected to the source of air under pressure, the probe tip 100 will be forced upwardly from contact with the wafer W. Tripping of the foot switch 72 cuts off the supply of air to the Z-actuators so that the probe tip 100 is released and delicately lowered downwardly on the springs 86 and 92 into resilient contact with the surface of the wafer W.

The marking heads D1 are identical in construction to the probe heads D except that mounting tips 125 with ink fountains 128 soldered to the lower ends thereof are substituted for the probe tips 100. The inking fountains 128 may be any conventional fountain holder, such as an India ink Le Roy or Writco well-type pen. Each marking head D1 has its X- and Z-actuators connected to a separate valve 130 which also communicates with the source of air under pressure but is actuated by a second foot switch 132. If a plurality of marking heads D1 are to be employed, for example, an individual red, blue and yellow, each to designate and codify a particular defect on the wafer W as measured by the probe heads D, separate parallel-arranged foot switches 132 communicating with respective valves 130 may be incorporated. Thus, when the probe heads D have their tips 100 withdrawn upwardly and rearwardly from contact with the wafer, only the marking heads D1 can be urged into contact therewith and vice versa.

Figures 3, 4, 5:
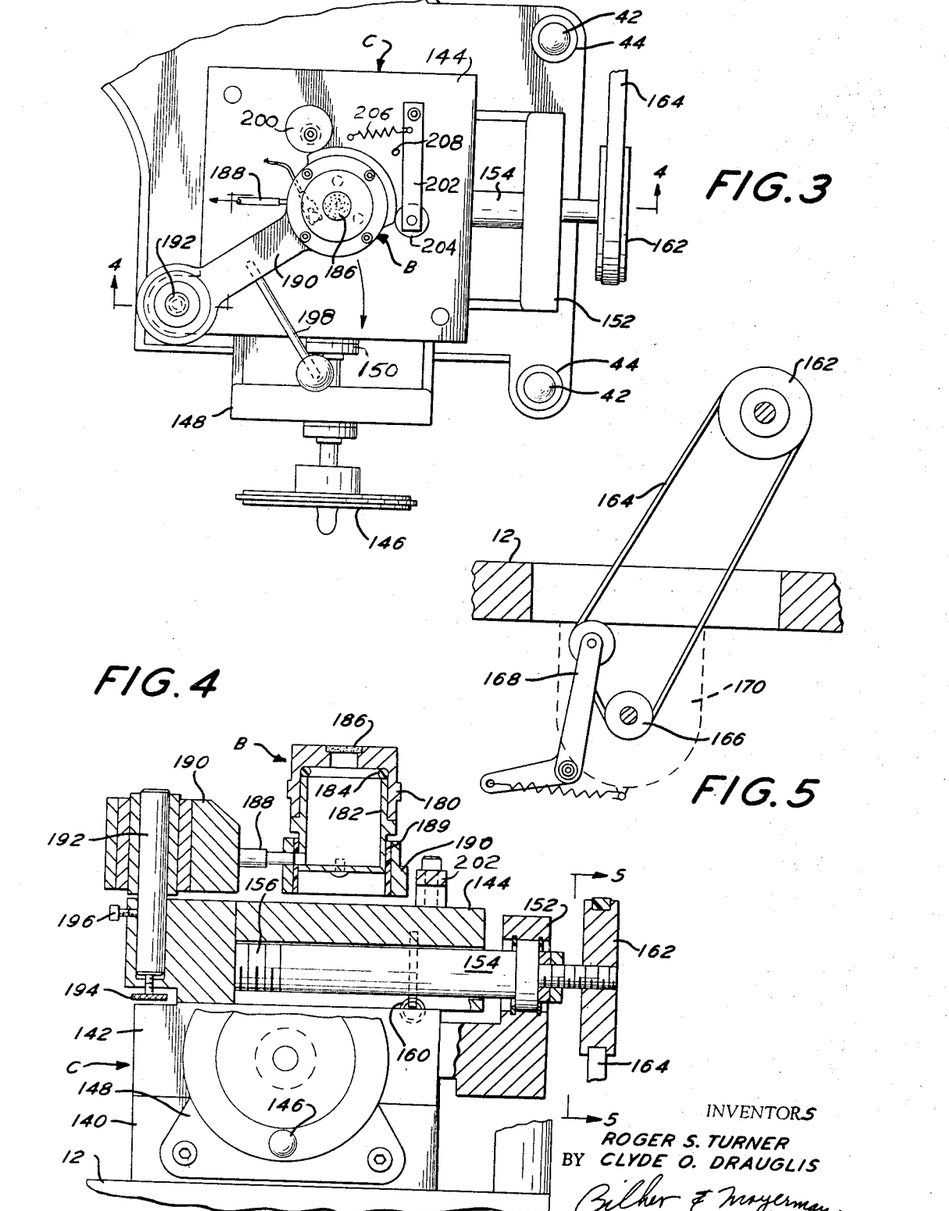
FIGURE 3 is a sectional view taken along lines 3—3 of FIGURE 1.
FIGURE 4 is a sectional view taken along lines 4—4 of FIGURE 3.
FIGURE 5 is a sectional view taken along lines 5—5 of FIGURE 4.

Referring now to FIGURES 3, 4 and 5, we show the details of construction of the chuck B and the indexing slider assembly C. The slider assembly C with the exception of an automatic indexing drive is substantially the same as that fully described and shown in prior U.S. Patent No. 3,185,927.

A base plate 140 affixed to the table top 12 slidably supports a Y-axis slider plate 142 which in turn slidably supports an X-axis slider plate 144. The Y-axis slider 142 is operated by crank wheel 146 rotatably retained in bracket 148 secured to the base pedestal 140. A lead screw 150 is turned by the hand wheel 146 and extends interiorly within the Y-slider 142 where it threadedly engages an internal nut therein (not shown) so as to move the Y-slider in or out of the plane of the paper, as shown in FIGURE 4. Suitable springs (not shown) diagonally extending and hung between the base 140 and the Y-slider tension the Y-slider against a guide (also not shown) so that pure axial motion will be produced and to take up backlash in the screw 150. Bracket 152 affixed to the Y-axis slider rotatably journals a shaft 154, the left end of which has a lead screw 156 extending within the interior of the X-slider 144. The lead screw 156 threadedly engages a nut 158 secured to the end of the X-slider 144. Springs 160 diagonally hung between the X-slider 144 and the Y-slider 142 preferentially bias the X-slider against a guide runner (not shown) on the Y-slider and to the right, as shown in FIGURE 4, to produce pure axial motion of the X-slider and to take up backlash in the screw 156. A pulley 162 is mounted on the outboard end of the shaft 154, and is coupled by timing belt 164 to pulley 166 secured to the drive shaft of indexing motor 170 which is mounted under the table 12. Spring loaded idler 168 maintains constant tension on the belt 164. Operation of the X-slider 144 is automatic in preset steps which are actuated by the raising of the probe tips 100. The X-slider 144 can also be moved over a continuous distance within the range of the lead screw 156 by actuation of rapid traverse push button 175, shown in FIGURE 10, or by turning the timing belt 164 by hand. Of course, the Y-axis slider 142 is manually operated by turning hand wheel 146 so as to shift the position of the wafer W to bring the next row of zones into position. Neither the X- nor the Y-slider has to be precise in setting since the movement by operator of the chessman micromanipulator determines the final positioning of the probe tips with respect to the wafer indicia. In smaller geometries, several lines of patterns may be inspected with a single setting of the Y-slider 142.

The vacuum chuck B comprises a sleeve 180 which is rotatably supported about cylindrical holder 182 and rests upon a Teflon O-ring 184 therein. A sponge metal or porous insert 186 is retained within the top plate of the sleeve 180. The interior of the holder communicates with a vacuum or exhaust line 188 so that a wafer slice W placed upon the porous insert 186 will be held thereon by suction. The holder 182 is mounted within a support arm 190 which is rotatably journaled on spindle 192 vertically extending upwardly from a well in the X-slider 144. An insulator collar 189 electrically isolates the chuck B from the arm 190. Knurled adjustment screw 194 raises or lowers the position of the shaft 192 within the well so as to conveniently control the vertical position of the chuck B above the slider assembly C. set screw 196 locks the vertical position of the chuck B whereby the probe heads D may be coarsely disposed above the wafer W. See FIGURES 1 and 4.

Lever handle 198 mounted on the arm 190 permits the chuck assembly B to be conveniently swung into or out of position against eccentric stop 200 adjustably secured to the upper face of the X-slider 144. Also supported on the X-slider is an over-center pivot lock finger 202 which has a roller 204 mounted at the free end thereof. Spring 206 urges the roller of the pivot finger into contact with the outer periphery of the support arm 190 so as to resiliently cam lock it into position against the eccentric stop 200. When the chuck B is swung out of working position (clockwise as shown in FIGURE 3) the over-center lock finger 202 abuts against stop pin 208.

The system is aligned by setting the micromanipulator F in a central or neutral position by orienting the chessman rod 28 so that it is roughly vertical. Similarly, the X- and Y-sliders 144 and 142 of the assembly C are centered by motor rapid traverse switch 175 and the Y-handwheel 146. The chuck B is swung forward by lever knob 198 into loading position and a scrap wafer W is placed upon the porous insert 186. The vacuum is then applied to the tubing 188 by an exhaust pump (not shown) or a vacuum line. The probe heads D and the marking heads D1 are placed on the platen E and oriented approximately in position on a pattern geometry with both the probe tips 100 and the pens 128 elevated (Z-actuators 56 air pressure activated). The micrometer screws 105 are also turned so that the probe mounts 96 are raised sufficiently to avoid the abutment of the tips 100 when the chuck B is swung into test position.

The chuck B is also vertically adjusted to an appropriate elevation by means of height adjustment screw 194. The chuck B is then swung into position by resiliently locking the support arm 190 against eccentric stop 200 and pivot finger 202. The micrometer screws 105 are adjusted until the points of each probe head D just clear the work, further adjustment of the chuck height screw 194 possibly being required at this stage. This is observed through microscope 34.

The foot switch 72 is depressed so as to effect cut-off of the supply of pressurized air to the Z-manifold fittings 49 and hence to the Z-actuators 114. The probe tips 100 are resiliently lowered on springs 92 into contact with the surface of the wafer W. It is to be noted that the X-actuators 56 are not pressurized at this stage so that the pistons 58 and hence the X-carriage 65 as well as the probe tips 100 are urged forwardly. Correspondingly, the marking pens 128 will be both elevated and retracted rearwardly. The force adjustment screws 84 on each probe head D are appropriately turned until the force of each probe tip 100 provides good wafer contact. This can be done with a force gauge while watching the tips through the microscope 34. The rate of speed at which the probe points are raised and/or lowered or brought forwardly into hovering position and/or retracted rearwardly therefrom is controlled by needle valves located in the pneumatic system manifold under the module 16. This control is particularly significant in the pneumatic system in view of the fact that the entire probe system is delicately balanced on springs. Thus, the rate of speed at which the X- and Y-actuators are reciprocated must be delicately controlled to avoid not only inertial banging of the components of the probe heads against each other but also to prevent the probe points 100b from slamming down and unintentionally gouging or peening the surface of the wafer W.

Releasing of the foot switch 72 now causes the Z-actuator 116 to elevate the Z-carriage 90 and the probe tips 100 so that the latter is perhaps .0005 to .001 inch above the wafer W. The sleeve 180 of chuck B is rotated on cylindrical holder 182 to orient the rows and files of the repeating patterns on the wafer W in alignment with the repeating patterns on the wafer W in alignment with the X- and Y-axial traverse of the slider assembly C. Rapid traverse switch 175 on the control box 16 is used to check X-axis alignment, and handwheel 146 to check Y-axis alignment of wafer orientation.

In order to accurately orient each of the probe tips 100 with respect to points on the wafer to be checked, the X-carriage 65 is positioned along its own longitudinal axis by turning X-adjustment screw 70 and the Y-carriage 75 is pivoted transversely thereto by Y-adjustment screw 80. The probes now have their tips 100 registering with a particular zone geometry. Depressing foot switch 72 will urge the tips into resilient contact with respective points or indicia on the wafer surface so that a measurement can be taken. Releasing the foot switch 72 elevates the probe tips 100 and then automatically actuates the motor drive 170 to shift the X-slider 144 one increment and bring the next zone on the wafer row roughly under the probe tips 100. Since the spacing between the tips 100 correlates with the spacing of the electrodes or indicia of the zone geometry, the probe heads D are now simultaneously brought into registration with the geometry of the next successive zone by moving the finger piece 30 of the micromanipulator F in the appropriate direction. Again, the foot switch 72 is depressed to resiliently urge the tips into contact with the newly exposed wafer zone.

If the test reading is unsatisfactory, the pen foot switch 132 is depressed. This causes the test probe tips 100 to both raise and retract while the fountain 128 is urged in the opposite direction (forwardly and downwardly) into contact with the defective zone so as to apply a blob of marking ink therein. The simultaneous elevation and retraction of the test probes 100 together with the forward and lowering motion of the pen 128 permits freedom of access to a very tiny area without interference to observation or testing. With an auotmatic test set (not shown), foot switch 132 is eliminated and a defective reading will cause automatic retraction of the probe tips together with engagement of the marking pen 128. In addition, two or more marking heads D1 can be employed, each having a particular color ink in its fountain 128 and operative by its own separate foot switch in order to designate the nature of a defective zone. The above operation is sequentially repeated to the end of the row. The Y-slider crank 146 is turned to position the probe tips over the next row, and the direction of the indexing motor 170 changed by reversing left/right traverse switch 212. The test operation is then repeated on the other rows of the wafer W.

Figure 10:
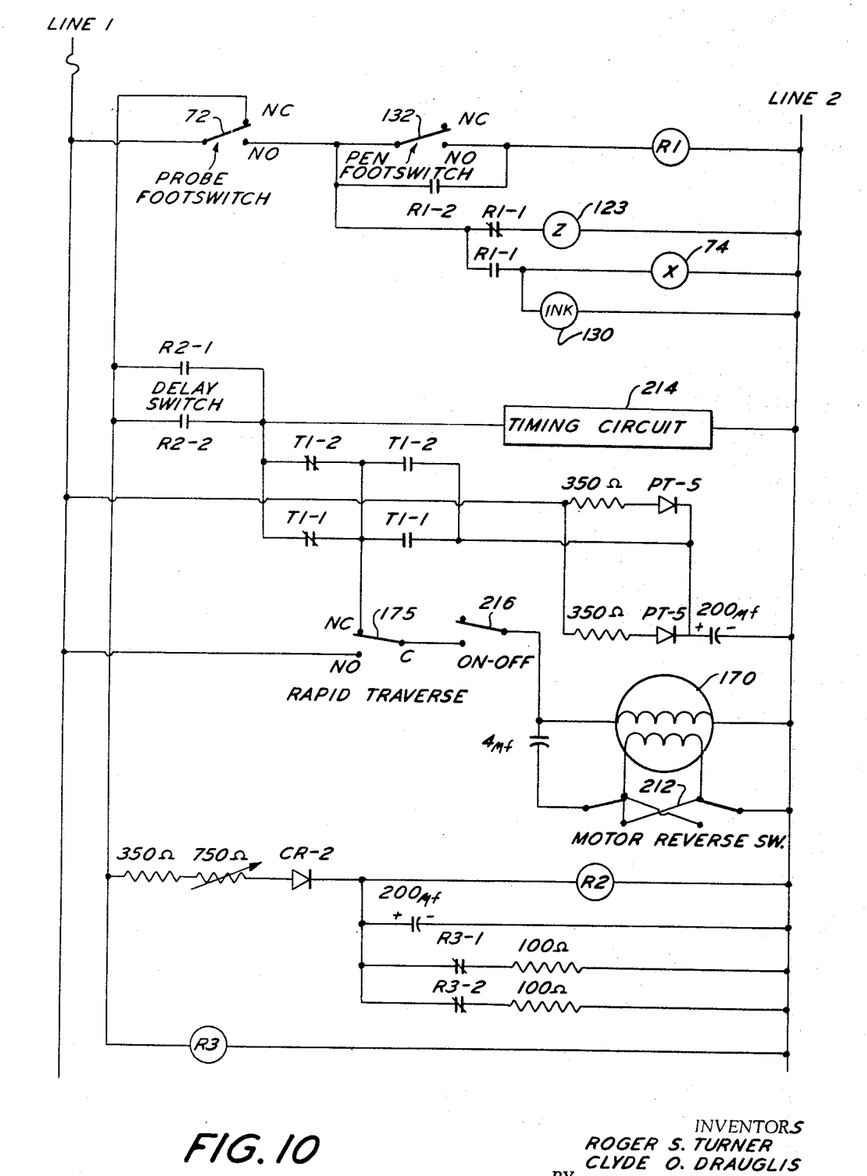
FIGURE 10 is a schematic diagram of the electrical control circuitry.

The electrical control system is shown in the across-the-line circuit diagram of FIGURE 10. With voltage applied across the line, power from line 1 through a parallel arranged pair of 350 ohm resistors and PT-5 diodes starts to charge a 200 microfarad capacitor. Power also passes through normally closed contact of probe foot switch 72, 350 ohm resistor, 750 ohm rheostat, and CR-2 diode to charge second 200 microfarad capacitor across relay coil R2. When voltage in second capacitor rises sufficiently, delay relay R2 operates to close contacts R2–1 which energize the timing circuit and cause the indexing timer on panel 16 to run. At the same time, power flows through parallel left-hand pair of timer relay contacts TI–2 and TI–1, rapid traverse switch 175 (NC–C) and motor ON-OFF switch 216 to motor windings. The position of the double-pole double-throw selector switch 212 to one of the motor windings determines the direction of rotation of the motor 170.

At the end of timer cycle which incidentally is adjustably set to produce indexing travel corresponding to the zone interval on the wafer, the timer relay switches whereby the right-hand pair of contacts TI–2 and TI–1 close. D.C. breaking power is applied to the motor winding. Since the 200 microfarad filter condenser has charged to full voltage, a high current braking pulse is applied to the motor 170 and causes it to stop almost instantaneously. Thereafter, reduced D.C. current continues to flow through the motor winding, but the drop through the 350 ohm series resistors lowers the voltage and current.

Depressing foot switch 72 energizes the Z-valve solenoid 123 through normally closed RI-1 contacts. The Z-valve is reverse connected so that energizing of valve 123 releases the air pressure from the Z-manifold 49. Hence, the actuators 116 drop and the Z-carriages 90 gently lower the spring 92 suspended probe tips 100 upon the wafer surface. Note that the normally open RI-1 contacts prohibit the X-retract solenoid 74 from being energized. Accordingly, each of the probe tips 100 will be forwardly situated in normal probing position. Releasing probe foot switch 72 opens the NO contact, de-energizes solenoid 123, and closes NC contact to initiate another timed indexing cycle for automatically advancing the next zone interval as described.

In order to mark a defective wafer, pen foot switch 132 is momentarily depressed while the probe switch 72 is also depressed. This energizes relay RI causing RI-2 contacts to lock across foot switch 132. In addition, the RI-1 contact pair reverses so as to de-energize Z-valve solenoid 123 and energize the X-retract solenoid 74. Accordingly, each of the probe tips lift and retract. At the same time, the pen solenoid 130 is energized causing it to move forwardly and down. Releasing the probe foot switch 72 now de-energizes relay RI so as to cause holding contacts RI-2 to open and reverse the positions of the RI-1 contacts. The inking solenoid 130 and the X-soleniod 74 become de-energized whereby the inking pen 128 both elevates and retracts while the probe tips 100 are urged forward. Since the Z-solenoid 123 is now de-energized, the probe tips 100 will be elevated from contact with the wafer surface. Elevation of the foot switch 72 also closes the NC contact to the indexing circuit to trip the timing cycle for traversing the slider assembly C through one interval of travel. Note that as many inking heads D1 as desired may be employed simply by including additional solenoids 130 connected through separate foot switch 132 or a rotary selector switch (not shown).

It is to be observed that the points 100 of the probes D are arranged about a pie section to take advantage of maximal utilization of space. The probe points 100 extend obliquely downward and conically taper toward their lower extremities, the latter construction affording optimum rigidity without detracting in any way from the efficient use of the space. Thus, in a given area, maximum rigidity of the probe points is combined with the obtaining of the maximum number of points. Similarly, this construction permits full freedom for inking without causing interference. When ink marking is called for, the probe points 100 are first vertically elevated from contact with the wafer surface W and then retracted with a controlled radial motion in a horizontal plane to yield access for the inking pens 128.

It is also to be noted that the probe points 100 are manipulated in hovering position (forward but elevated) until they are brought into vertically spaced registration with the indicia on the work. The probe points are then released so that they are resiliently depressed into contact with the indicia electrodes and a "Go" or "No-Go" signal is read. The signal may either be read by the operator or it may be coupled with a computer system (not shown). If the reading is "Go" (within tolerances prescribed) the operator or the computer can signal the motor drive 170 to automatically index the X-slider 144 to the next position, thereby bringing the next set of geometry into test position. This occurs when the probe foot switch 72 is released immediately after the probes are raised into hovering position. If a "No-Go" signal is read, either the operator or the computer can tell the probes 100 to raise and retract and thereafter introduce the inking probe 128 which moves in and lowers. Operator control is performed by foot switch 132 while computer control may be automatically actuated by closing comparable contacts. After inking, the pen 128 elevates and retracts, and each of the probes 100 move forwardly but do not lower so as to remain in hovering position while the motor drive indexes the table.

Of primary significance also is the fact that the E-springs 92 provide linear vertical motion throughout their useful range and thereby yield straight line vertical movement, both up and down, of the probe points. Such action precludes scrubbing of the wafer surface. At the same time, the relatively large mass of the resiliently suspended probe mount and tip is counterbalanced by the adjustable force counter spring 86. The difference between the weight of the foregoing mass and the upward force of the counter spring 86 is the loading force of the probe tips 100. The probe loading can be delicately adjusted by thumb screw 84 down to 2 grams ± ½ gram.

Although this invention has been described in considerable detail, such description is intended as being illustrative rather than limiting since the invention may be variously embodied, and the scope of the invention is to be determined as claimed.

What is claimed is:

1. Apparatus for use in measuring the electrical characteristics of wafer specimens having rows of repeating patterns of electrical indicia arranged at regular intervals in zones on the surface thereof, comprising: a frame, a chuck for supporting a wafer with the surface patterns exposed in substantially a horizontal plane, slider means in said frame for positioning said chuck along a horizontal axis parallel to the rows of patterns, a platen in said frame, means for slidably supporting said platen adjacent said chuck in a plane substantially parallel to the wafer surface, a plurality of probe heads, each including a probe tip and spring means resiliently suspending the tip therein, means for detachably securing said probe heads in random disposition at any desired location on said platen so that the probe tips are in registration with the respective indicia on the wafer surface and adjacently spaced therefrom, actuating means for effecting reciprocable movement of said probe tips between an engaging position in contact with the respective indicia and a released position adjacently spaced from a wafer surface, and drive means activated by the release of said probe actuating means automatically indexing said slider means one zone interval so as to move the next succeeding pattern in the row into position for testing.

2. The invention of claim 1 including adjustable counter springs in each of said probe heads for varying the degree of force exerted by the respective tips thereof upon being depressed into contact with the wafer surface.

3. The invention of claim 2 including fine positioning means for individually bringing said probe tips into precise registration with respective points on the wafer.

4. A probe head for measuring the electrical characteristics of a semiconductor comprising a base, means for attaching said base in random slidable disposition at any desired location upon a horizontal surface, an X-carriage, spring means resiliently supporting said X-carriage upon said base, reciprocable means for displacing said X-carriage along a horizontal axis between a forward position and a retracted position thereupon, means for precisely adjusting the forward position of said X-carriage on said horizontal axis, a Y-carriage supported upon said X-carriage, means for precisely adjusting the position of said Y-carriage in a horizontal plane transverse to said first horizontal axis, a Z-carriage, spring means resiliently suspending said Z-carriage from said Y-carriage, a probe tip downwardly projecting from said Z-carriage and electrically insulated therefrom, vertically reciprocable stop means elevating the Z-carriage a predetermined distance to a hovering position so that the probe tip is raised just out of contact with the semiconductor device, and actuating means releasably disengaging said stop means to resiliently depress said probe tip along a pure vertical axis into delicate contact with a point on the semiconductor.

5. The invention of claim 4 wherein said Z-carriage is suspended upon a pair of vertically spaced E-shaped flat springs, the outer arms of said springs being coupled at the ends thereof to said Y-carriage and the central arm of said springs being coupled to said Z-carriage to define a parallelogram suspension which yields pure vertical motion without scrub.

6. The invention of claim 4 including adjustable counter force means resiliently opposing the Z-carriage suspension means whereby the contact pressure of said probe tip can be varied in order to provide good electrical contact and at the same time prevent damage to the probe tip or gouging and peening of the semiconductor device.

7. A probe head for measuring the electrical characteristics of a semiconductor device comprising a base, means for magnetically attaching said base in random slidable placement upon a horizontal surface, an X-carriage, means resiliently suspending said X-carriage upon said base including means for precisely positioning said X-carriage along a predetermined horizontal axis on said base and opposing said resilient means, an adjustable Y-carriage secured to said X-carriage including means for precisely positioning said Y-carriage in a horizontal direction transverse to the positioning axis of said X-carriage, a Z-carriage, resilient means suspending said Z-carriage on said Y-carriage along a vertical axis, vertically reciprocable means in the head having an upper position restraining said Z-carriage from descending below a predetermined level and a lower position at which said Z-carriage is released, a pointed probe tip downwardly projecting from said Z-carriage and electrically insulated therefrom so as to hover immediately above the semiconductor device when said vertically reciprocable means is at the upper portion of the stroke, and actuating means for lowering said reciprocable means to release said Z-carriage whereby said tip will be resiliently depressed along a pure vertical axis into controlled force contact with a point on said semiconductor device immediately below the hovering position.

8. The invention of claim 7 wherein said second resilient means comprises a pair of vertically spaced flat springs E-shaped in configuration, the outer members of which are coupled to the Y-carriage and the medial members of which are coupled to the Z-carriage.

9. The invention of claim 7 including means to throw said X-carriage a predetermined distance along a horizontal axis between a forward position and a retracted position so as to permit retraction of said X-carriage when said tip is being elevated.

10. The invention of claim 9 wherein an ink fountain is mounted on the end of said tip for indicating defective zones on the semiconductor with a colored ink spot.

11. An instrument for use in measuring and checking the electrical characteristics of wafer specimens having discrete zones of repeating patterns of electrical indicia arranged on the surface thereof in regular rows and files, comprising:
a frame,
means for supporting a wafer in said frame with the surface patterns exposed,
a platen in said frame adjacent said wafer supporting means and having a substantially smooth and flat work surface thereon and including an aperture therethrough,
a plurality of probe heads each including a base member and a probe tip supported therein,
means for magnetically attaching each of said base members independently to the work surface of said platen in any desired orientation thereon about said aperture whereby said probe heads may be slidably disposed on said work surface along respective X-, Y-, and polar axes of said heads so as to permit coarse positioning of said probe tips with respect to a wafer pattern of any size and configuration,
means for adjusting each of said probe tips independently along respective X-, Y-, and Z-axes relative to its supporting base whereby the probe tips may be brought into precise registration with respective indicia of the particular pattern on the wafer and adjacently spaced therefrom, and
means for relatively moving said probe tips and said wafer supporting means toward each other so as to urge all of said probe tips through said aperture simultaneously into contact against the respective indicia with a predetermined loading force.

12. The instrument of claim 11 including means for relatively moving said platen and said wafer supporting means with respect to each other along a line parallel to the rows of pattern zones,
and means for automatically indexing the relative movement of said platen and said wafer supporting means one zone interval at a time so as to move the next succeeding pattern zone into position after the immediate preceding pattern has been checked.

13. The instrument of claim 11 including a marking head for indicating defective zones, said marking head including a base and a marking tip supported thereon, means for magnetically attaching said marking head base upon the working surface of said platen in an array with the group of said probe heads, and
means for reciprocating said marking tip along an axis normal to the wafer surface.

14. The instrument of claim 13 including means for displacing each of said probe tips between a forward and a retracted position with respect to its base member along an axis substantially parallel to the wafer surface,
means normally biasing said probe tip displacing means in the forward position,
means for displacing said marking tip between a forward and a retracted position with respect to its base along an axis substantially parallel to the wafer surface,
means normally biasing said marking tip in the retracted position,
and means for actuating said marking tip reciprocating means and for simultaneously displacing said marking tip into forward position and into contact with the wafer surface and at the same time effecting withdrawal of said probe tips away from contact with the indicia and into retracted position whereby a large plurality of points on the wafer pattern can be checked and defective zones marked.

15. An instrument for use in measuring and checking the electrical characteristics of wafer specimens having repeating patterns of electrical indicia arranged in zones on the surface thereof, comprising:
a frame,
means for supporting a wafer in said frame with the surface patterns exposed,
a platen having an aperture therethrough and mounted in said frame adjacent said wafer supporting means,
a plurality of probe heads supported on said platen in generally circular configuration about said aperture each including a pointed probe tip obliquely projecting therefrom in a generally forwardly and downwardly directed disposition,
at least one marking head supported on said platen and arranged in circular configuration with said probe heads and including a marking tip obliquely projecting therefrom in a generally forwardly and downwardly directed disposition, means for vertically reciprocating said marking and probe tips within their respective heads between a hovering position spaced from the wafer surface and an engaging position in contact with said wafer surface within a pattern zone, means for displacing said marking and probe tips along horizontal axes within their respective heads between a forward and retracted position therein, means normally biasing said probe tips in the forward position and means simultaneously biasing said marking tip in the retracted position, means for actuating the vertical reciprocating means of said probe tips into engagement with the respective pattern indicia for inspecting the characteristics thereof, and means activating the respective biasing means and vertical reciprocating means of said probe tips and said marking tips to displace said probe tips into retracted-hovering position and simultaneously to move said marking tip into forward-engaging position in contact with a defective zone.

16. The instrument of claim 15 wherein said vertically reciprocable means constitutes pneumatically operated pistons.

17. The instrument of claim 16 wherein said horizontal displacing means constitutes pneumatically operated pistons.

18. The instrument of claim 17 wherein spring means resiliently support said marking and probe tips within their respective heads.

19. A probe head for use in measuring the electrical characteristics of a wafer comprising:

a base, an X-carriage, spring means resiliently supporting said X-carriage on said base, means for displacing said X-carriage along a horizontal axis in said base between a forward position at which it is normally disposed and a retracted position, a Y-carriage supported on said X-carriage, a Z-carriage including a probe tip supported therein, spring means suspending said Z-carriage from said Y-carriage, limiting means for restraining said Z-carriage from descending below a predetermined first level at which said probe tip is carried in a hovering position adjacently spaced from the wafer surface, and means operative to lower said limiting means and cause said Z-carriage to descend from said first level and so as to depress said probe tip into a contact engaging position with the wafer surface with a predetermined loading force.

20. The probe head of claim 19 including fine adjusting means coupled respectively with said X-, Y- and Z-carriages for positioning each of said carriages precisely along the corresponding X-, Y-, and Z-axes.

21. The probe head of claim 19 wherein said probe tip tapers to a conical point obliquely projecting from said head in a generally forwardly and downwardly directed disposition therefrom.

22. The probe head of claim 19 including a cantilevered flat spring extending from said Y-carriage and having an end interposed between said Z-carriage and said limiting means, and means for adjusting the upward bias of said flat spring upon said Z-carriage.

23. An instrument for use in measuring and checking the electrical characteristics of wafer specimens having patterns of electrical indicia within zones on the surface thereof comprising:

a frame, means for supporting a wafer in said frame with the surface patterns exposed, a plurality of probe heads, means supporting said probe heads in said frame in generally circular configuration, each probe head including a probe tip obliquely projecting therefrom in a generally forwardly and downwardly extending position directed toward a corresponding point of indicia within one zone, means for vertically reciprocating said probe tips between a hovering position adjacently spaced from the wafer surface and a depressed position in contact with respective indicia on the surface, means for displacing said probe tips along respective horizontal axes in said respective probe heads between forward and retracted positions therein, a marking head supported in said frame and arranged in circular configuration with said probe heads and including a marking tip obliquely projecting therefrom in a generally forwardly and downwardly directed disposition therein, means for displacing said marking tip along a horizontal axis in said marking head between a retracted position and a forward position, means for vertically reciprocating said marking tip between an elevated position spaced from the wafer surface and a depressed position in contact with said surface, and means for simultaneously actuating said marking tip and said probe tip vertically reciprocating means and said marking tip and said probe tip displacing means to move all of said probe tips along a vertically diagonal path from engagement with the surface at the forward positions to elevated spaced and retracted positions while at the same time advancing said marking tip from an elevated retracted position to a depressed forward position in contact with a defective zone whereby maximum utilization of space is provided within a given area.

24. The instrument of claim 23 wherein said probe tips each terminate in conically tapered points.

References Cited

UNITED STATES PATENTS

| | | | |
|---|---|---|---|
| 2,546,256 | 3/1951 | Drake | 324—37 |
| 2,918,648 | 12/1959 | Ludman | 324—158 X |
| 2,922,954 | 1/1960 | Bigelow | 324—158 |
| 3,009,109 | 11/1961 | Jankowski | 324—158 |
| 3,134,942 | 5/1964 | Rhodes | 324—158 X |
| 3,185,927 | 5/1965 | Margulis | 324—158 |
| 3,264,556 | 8/1966 | Krantz | 324—158 X |

RUDOLPH V. ROLINEC, *Primary Examiner.*

W. L. CARLSON, *Examiner.*

E. L. STOLARUN, *Assistant Examiner.*